United States Patent
Nishimura et al.

(10) Patent No.: US 12,512,648 B2
(45) Date of Patent: Dec. 30, 2025

(54) SEMICONDUCTOR DEVICE AND METHOD OF MANUFACTURING SEMICONDUCTOR DEVICE

(71) Applicant: Mitsubishi Electric Corporation, Tokyo (JP)

(72) Inventors: Shinya Nishimura, Tokyo (JP); Shuichi Hiza, Tokyo (JP); Kunihiko Nishimura, Tokyo (JP); Eiji Yagyu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 646 days.

(21) Appl. No.: 17/915,104

(22) PCT Filed: May 14, 2020

(86) PCT No.: PCT/JP2020/019180
§ 371 (c)(1),
(2) Date: Sep. 28, 2022

(87) PCT Pub. No.: WO2021/229734
PCT Pub. Date: Nov. 18, 2021

(65) Prior Publication Data
US 2023/0155351 A1 May 18, 2023

(51) Int. Cl.
*H01S 5/32* (2006.01)
*H01S 5/02* (2006.01)
*H01S 5/323* (2006.01)

(52) U.S. Cl.
CPC .......... *H01S 5/32341* (2013.01); *H01S 5/021* (2013.01); *H01S 5/0217* (2013.01)

(58) Field of Classification Search
CPC .... H01S 5/32341; H01S 5/021; H01S 5/0217; H10D 62/8503; H01L 24/83; H01L 21/7806; H01L 21/76898; H01L 21/02
See application file for complete search history.

(56) References Cited

U.S. PATENT DOCUMENTS

| | | | |
|---|---|---|---|
| 7,508,014 B2 | 3/2009 | Tanimoto | |
| 2008/0026248 A1* | 1/2008 | Balagopal | C23C 28/042 |
| | | | 428/688 |

(Continued)

FOREIGN PATENT DOCUMENTS

| | | |
|---|---|---|
| JP | 9-63912 A | 3/1997 |
| JP | 2008-22866 A | 2/2008 |

(Continued)

OTHER PUBLICATIONS

GB Office Action issued on Sep. 24, 2024, in corresponding Patent Application No. GB2215350.6, 2pp.

(Continued)

*Primary Examiner* — S M Sohel Imtiaz
(74) *Attorney, Agent, or Firm* — XSENSUS LLP

(57) ABSTRACT

A semiconductor device includes a first substrate, a semiconductor layer consisting of a nitride-based compound semiconductor, and a bonding layer bonded to the first substrate and the semiconductor layer between the first substrate and the semiconductor layer, and containing at least one of constituent elements of the nitride-based compound semiconductor.

8 Claims, 14 Drawing Sheets

(56) References Cited

U.S. PATENT DOCUMENTS

| | | | |
|---|---|---|---|
| 2009/0325343 A1* | 12/2009 | Lee | H10D 88/01 |
| | | | 438/455 |
| 2013/0256739 A1* | 10/2013 | Matsuda | H10H 20/8582 |
| | | | 438/46 |
| 2014/0021488 A1 | 1/2014 | Lee | |
| 2018/0083173 A1* | 3/2018 | Yamamoto | H10H 20/857 |
| 2018/0114726 A1* | 4/2018 | Odnoblyudov | H10D 84/85 |
| 2018/0358261 A1* | 12/2018 | Beche | H10D 86/01 |

FOREIGN PATENT DOCUMENTS

| | | | |
|---|---|---|---|
| JP | 4650224 B2 | | 3/2011 |
| JP | 2012-99710 A | | 5/2012 |
| JP | 2012099710 A | * | 5/2012 |
| JP | 2014-22742 A | | 2/2014 |
| JP | 2017-139322 A | | 8/2017 |

OTHER PUBLICATIONS

International Search Report and Written Opinion mailed on Aug. 4, 2020, received for PCT Application PCT/JP2020/019180, filed on May 14, 2020, 8 pages including English Translation.

* cited by examiner

SEMICONDUCTOR DEVICE AND METHOD OF MANUFACTURING SEMICONDUCTOR DEVICE

CROSS-REFERENCE TO RELATED APPLICATION

The present application is based on PCT filing PCT/JP2020/019180, filed May 14, 2020, the entire contents of which is incorporated herein by reference.

TECHNICAL FIELD

The present disclosure relates to a semiconductor device and a method of manufacturing the semiconductor device.

BACKGROUND ART

Patent Document 1 discloses a technique for separating a GaN layer from a sapphire substrate by injecting a laser into a gallium nitride (GaN) layer grown on the sapphire substrate. Such a separation process is also referred to as a laser lift-off process. As the laser, a laser having a wavelength absorbed by GaN is adopted. When the laser is injected into the GaN layer through the sapphire substrate, GaN is separated into gallium (Ga: liquid or solid) and nitrogen ($N_2$) gas at the boundary portion of the GaN layer on the sapphire substrate side. In this manner, the GaN layer is separated from the sapphire substrate. In Patent Document 1, after polishing of the separated surface of the separated GaN layer, the GaN layer is bonded to a substrate different from the sapphire substrate.

In addition, Patent Document 2 also describes a laser lift-off process. Also in Patent Document 2, a semi-insulating GaN layer is separated from the sapphire substrate by the laser lift-off process. Then, the GaN layer is bonded to a heat conductive substrate by a bonding layer consisting of Au and Sn.

Patent Document 3 also describes a laser lift-off process. In Patent Document 3, a GaN-based semiconductor layer is laminated on a substrate for growth to form a semiconductor laminated body, and then the semiconductor laminated body is separated from the substrate for growth by the laser lift-off process. Then, a separately prepared substrate is adhered to the semiconductor laminated body with, for example, an adhesive or the like.

PRIOR ART DOCUMENTS

Patent Document(s)

[Patent Document 1] Japanese Patent No. 4650224
[Patent Document 2] Japanese Patent Application Laid-Open No. 2014-22742
[Patent Document 3] Japanese Patent Application Laid-Open No. 2008-22866

SUMMARY

Problem to be Solved by the Invention

However, in Patent Documents 1 to 3, irregularities are formed on the GaN surface subjected to the laser lift-off process. For the removal of the irregularities, there has been a problem that a polishing process is required and the productivity is low. Further, in the case where the substrate is bonded to the surface subjected to the laser lift-off process, a material different from the semiconductor layer such as an adhesive is adopted as a bonding layer for bonding them. This can also lead to a decrease in productivity.

Therefore, the present disclosure has been made in view of the above-mentioned problems, and an object thereof is to provide a technique for realizing a highly productive semiconductor device.

Means to Solve the Problem

According to the present disclosure, a semiconductor device includes a first substrate, a semiconductor layer consisting of a nitride-based compound semiconductor, and a bonding layer bonded to the first substrate and the semiconductor layer between the first substrate and the semiconductor layer, and containing at least one of constituent elements of the nitride-based compound semiconductor.

According to the present disclosure, a method of manufacturing a semiconductor device including a first substrate, a semiconductor layer constituting of a nitride-based compound semiconductor, a bonding layer provided between the first substrate and the semiconductor layer and bonding the first substrate and the semiconductor layer to each other, the method includes a first step of injecting a laser into the semiconductor layer formed on a second substrate and separating the second substrate from the semiconductor layer, a second step of overlapping the first substrate and the semiconductor layer to each other, and a third step of forming the bonding layer that bonds the first substrate and the semiconductor layer to each other by reacting a product formed on a bonded surface of the semiconductor layer by irradiation of the laser.

Effects of the Invention

Productivity can be improved.

The objects, features, aspects, and advantages of the present disclosure will become more apparent from the following detailed description and the accompanying drawings.

DESCRIPTION OF EMBODIMENT(S)

Figure 1:
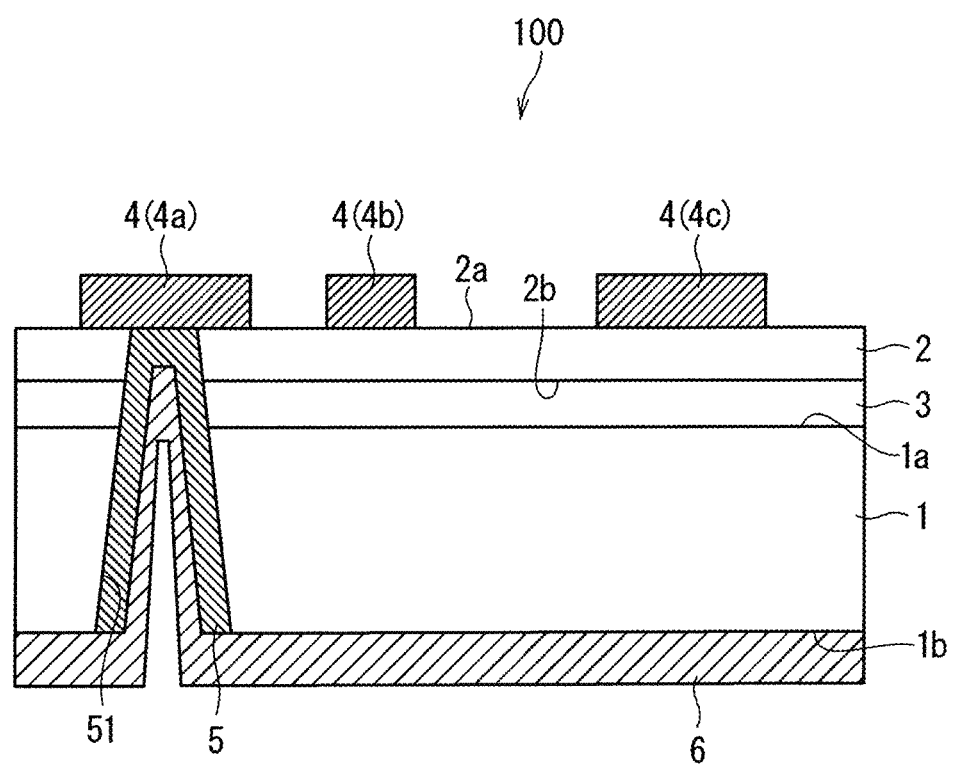
FIG. 1 A cross-sectional view of schematically illustrating a configuration example of a semiconductor device according to a first embodiment.

Hereinafter, embodiments and methods of manufacturing of a semiconductor device according to the present disclosure will be described in detail with reference to the drawings. It should be noted that the embodiments will not make a limitation on the description, appropriate changes can be made as long as the purpose thereof is not deviated. Further, in the drawings illustrated below, the scale of each layer or each member may differ from the actual scale for easy understanding, and the same applies between the drawings.

First Embodiment

FIG. 1 is a cross-sectional view schematically illustrating a configuration example of a semiconductor device 100 according to the first embodiment. The semiconductor device 100 includes a first substrate 1, a semiconductor layer 2, and a bonding layer 3. The semiconductor device 100 illustrated in FIG. 1 is, for example, a field effect transistor (FET) and further includes a plurality of electrodes 4.

The first substrate (hereinafter referred to as a bonded substrate) 1 has an upper surface 1a and a lower surface 1b. The bonded substrate 1 is, for example, a semi-insulating substrate, and as a more specific example, is a silicon (Si) substrate or a silicon carbide (SiC) substrate.

The semiconductor layer 2 has an upper surface 2a and a lower surface 2b. The lower surface 2b of the semiconductor layer 2 is opposite to the upper surface 1a of the bonded substrate 1, and the bonding layer 3 is provided between the lower surface 2b of the semiconductor layer 2 and the upper surface 1a of the bonded substrate 1. The bonding layer 3 is bonded to the upper surface 1a and the lower surface 2b. That is, the bonding layer 3 fixes the semiconductor layer 2 and the bonded substrate 1 to each other. In the following, the upper surface 1a is also referred to as a bonded surface 1a, and the lower surface 2b is also referred to as a bonded surface 2b.

The semiconductor layer 2 includes, for example, a nitride-based compound semiconductor. The nitride-based compound semiconductor includes, for example, a compound containing nitrogen and a Group 3 element, and as a more specific example, at least one of gallium nitride (GaN), aluminum gallium nitride (AlGaN), and aluminum nitride (AlN). As will be described later, the semiconductor layer 2 may be a laminated body in which a plurality of functional layers constituting of semiconductors are laminated. Alternatively, the semiconductor layer 2 may be composed of a single semiconductor layer.

When the semiconductor device 100 is an electric field effect transistor, for example, the semiconductor layer 2 is formed by laminating a buffer layer, a barrier layer, a channel layer, and a cap layer in this order from the bonded substrate 1 side. Each of the buffer layer, the barrier layer, the channel layer and the cap layer contains a nitride-based compound semiconductor, and is composed of, for example, GaN, AlGaN or AlN.

It should be noted that, for the functional layers constituting the semiconductor layer 2, various layers other than the above-mentioned functional layers may be adopted to, or some of the above-mentioned functional layers may be omitted. Further, each functional layer may be composed of a single semiconductor layer, or may be composed of a plurality of types of semiconductor layers.

In the example of FIG. 1, the electrodes 4 are partially formed on the upper surface 2a of the semiconductor layer 2. In the example of FIG. 1, three electrodes 4a to 4c are formed on the upper surface 2a of the semiconductor layer 2 as a plurality of electrodes 4. The electrode 4b is, for example, a gate electrode. The electrodes 4a and 4c are provided on opposite sides of the electrode 4b. The electrode 4a is, for example, a source electrode, and the electrode 4c is, for example, a drain electrode. The electrodes 4 are formed of a conductor such as metal.

An insulating protective film (not illustrated) may be formed on the upper surface 2a of the semiconductor layer 2 and the plurality of electrodes 4. The insulating protective film contains, for example, at least one of silicon nitride (SiN) and aluminum oxide ($Al_2O_3$). The insulating protective film is formed so as to cover the upper surface 2a of the semiconductor layer 2 and the electrodes 4. However, if the electrodes 4 need to be electrically connected to the external wiring, parts of the electrode 4 are not covered with the insulating protective film, and the electrodes 4 are connected to the external wiring in the parts. That is, a via hole is formed in the insulating protective film, and the electrode 4 is connected to the external wiring through the via hole. For example, the electrodes 4b and 4c may be connected to the external wiring, respectively.

In the example of FIG. 1, the semiconductor device 100 further includes, for example, a lead-out electrode 5 and an electrode 6. Further, in the example of FIG. 1, the semiconductor device 100 has a via hole 51 extending through the bonded substrate 1, the bonding layer 3, and the semiconductor layer 2. The electrode 4a is exposed on the bottom surface of the via hole 51. The lead-out electrode 5 covers the inner wall of the via hole 51 and the exposed surface of the electrode 4a. The electrode 6 is formed on the lower surface 1b of the bonded substrate 1 and the lead-out electrode 5. The electrode 6 is also referred to as a back surface electrode. The electrode 6 is electrically connected to the electrode 4a via the lead-out electrode 5. The lead-out electrode 5 and the electrode 6 are also formed of a conductor such as metal.

The lead-out electrode 5 and the electrode 6 are not always necessary, and may be connected to an external wiring with the same structure as the electrodes 4b and 4c. Further, the semiconductor device 100 does not necessarily have to be a field effect transistor, and may be, for example, various semiconductor devices such as a semiconductor diode or a semiconductor laser.

The bonding layer 3 contains at least one of the constituent elements of the semiconductor layer 2. For example, the bonding layer 3 contains gallium (Ga), which is one of the constituent elements of the semiconductor layer 2. As a more specific example, the bonding layer 3 contains a compound (for example, a gallium compound) of the constituent element (for example, gallium) and substance other than the constituent element. For example, the bonding layer 3 contains an oxide or a halide formed by reacting a constituent element of the semiconductor layer 2 with oxygen or a halogen substance. As a more specific example, the bonding layer 3 contains a gallium oxide as an oxide produced by the reaction of the constituent element with oxygen.

The bonded surface 2b of the semiconductor layer 2 has, for example, an irregularity pattern (not illustrated) which is a laser irradiation trace, as will be described in detail later. This laser irradiation is performed in the manufacturing process (described later) of the semiconductor device 100. The irregularity pattern is formed two-dimensionally on the entire surface of the bonded surface 2b. The bonding layer 3 fills the irregularities of the bonded surface 2b and adheres to the bonded surface 2b.

Figure 2:
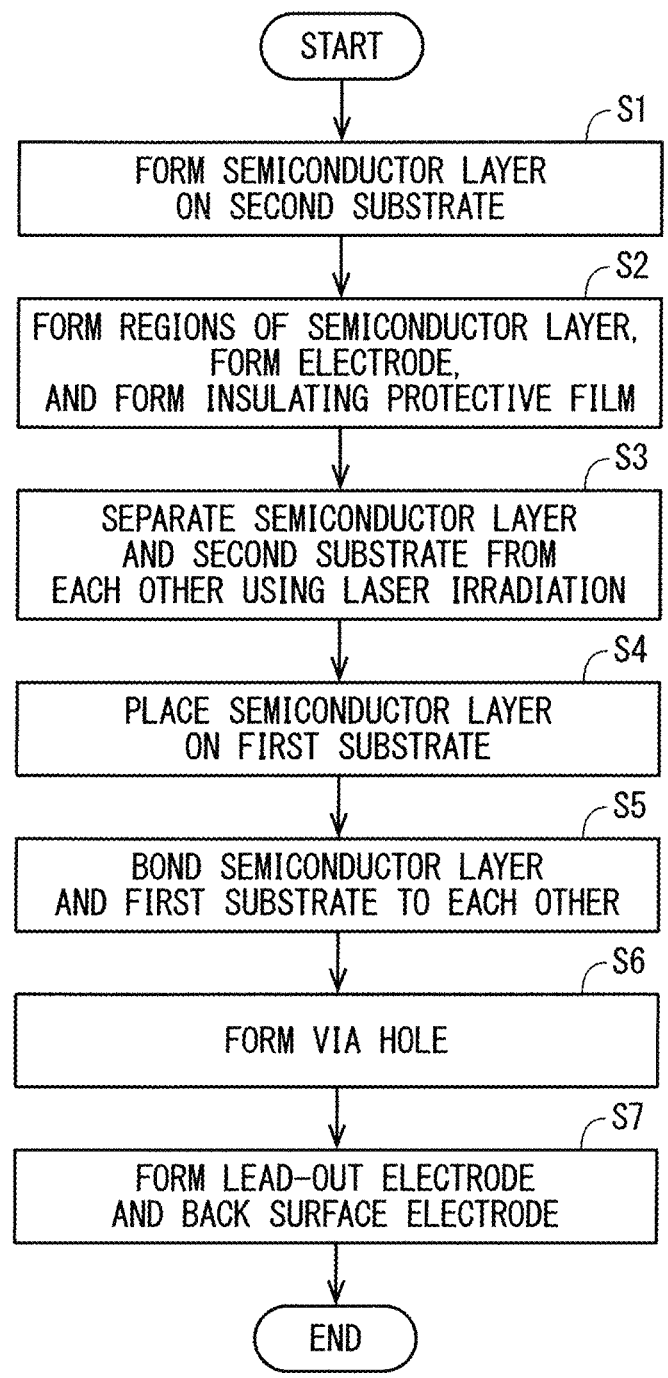
FIG. 2 A flowchart illustrating an example of a method of manufacturing the semiconductor device according to the first embodiment.
Figure 3:
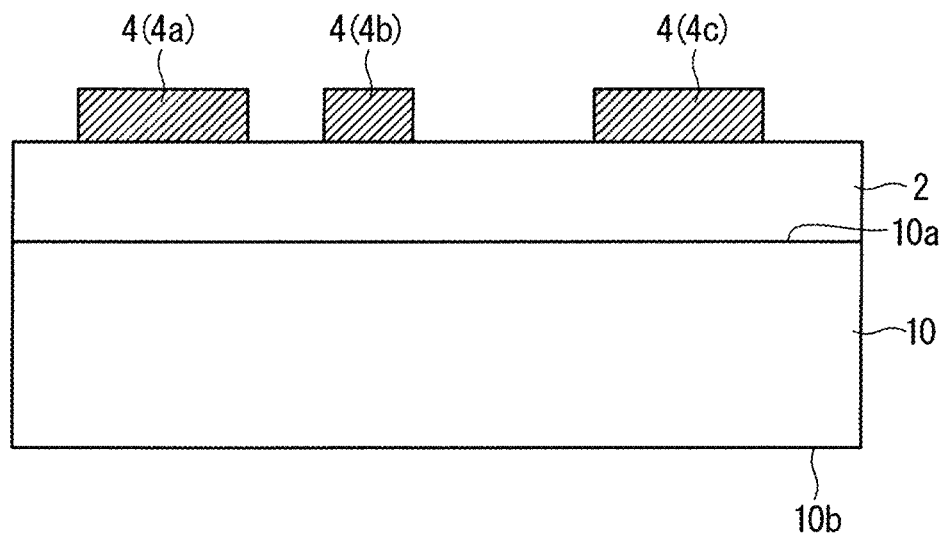
FIG. 3 A cross-sectional view schematically illustrating a configuration example in the process of manufacturing the semiconductor device.
Figure 4:
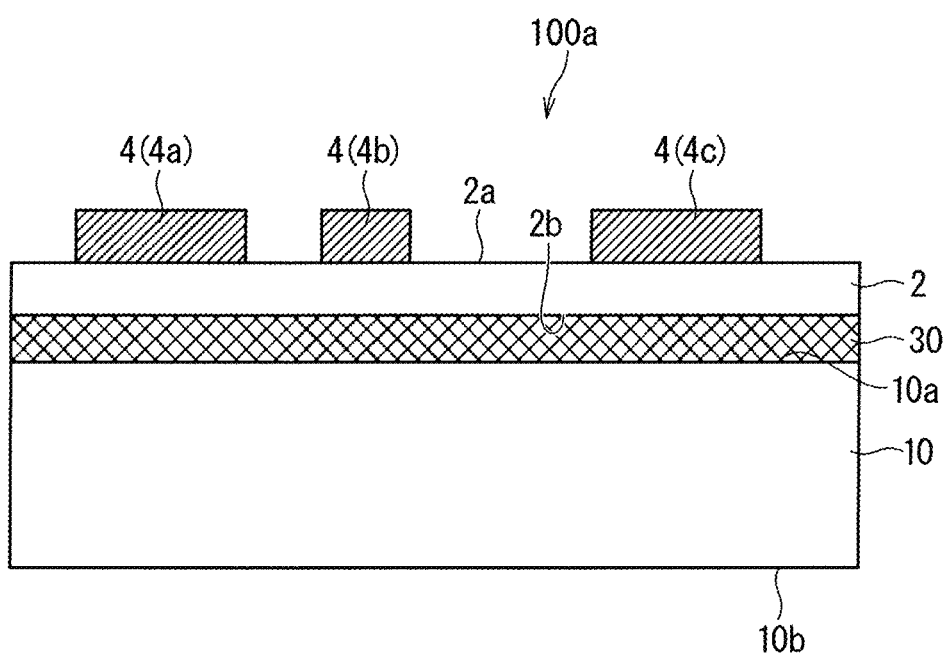
FIG. 4 A cross-sectional view schematically illustrating a configuration example in the process of manufacturing the semiconductor device.
Figure 5:
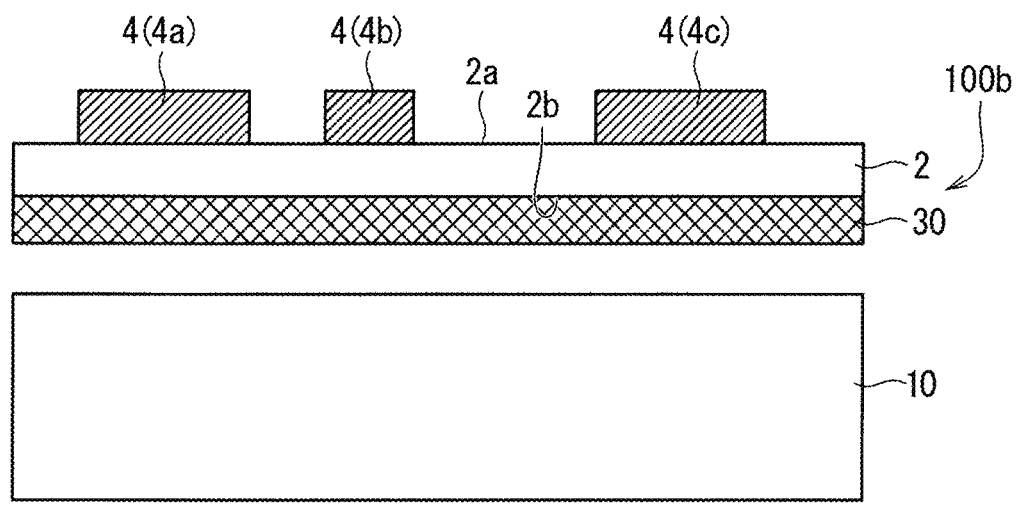
FIG. 5 A cross-sectional view schematically illustrating a configuration example in the process of manufacturing the semiconductor device.

Next, an example a method of manufacturing the semiconductor device 100 will be described. FIG. 2 is a flowchart illustrating an example of a manufacturing method of the semiconductor device 100, and FIGS. 3 to 7 are cross-sectional views schematically illustrating a configuration example in the process of manufacturing the semiconductor device 100. First, in Step S1, the semiconductor layer 2 is formed on a second substrate 10. The second substrate 10 is a substrate for crystal growing of the semiconductor layer 2, and includes, for example, a sapphire substrate. The semiconductor layer 2 is formed on an upper surface 10a of the second substrate 10 by, for example, a growth method such as an organometallic vapor phase growing technique. For example, the semiconductor layer 2 is formed by forming a buffer layer, a barrier layer, a channel layer, and a cap layer, all of which are made of nitride-based compound semiconductors, in this order on the upper surface 10a of the second substrate 10. As described above, the semiconductor layer 2 is composed of GaN, AlGaN, AlN, and the like, and none of the functional layers need to be a single layer, and may be composed of a plurality of layers. Further, some layers may be omitted. Further, impurities such as iron (Fe) or carbon (C) may be added to each functional layer, if necessary. In this Step S1, the epitaxial growth of the semiconductor layer 2 on the second substrate 10 produces a laminated structure in which the second substrate 10 and the semiconductor layer 2 are integrated.

Next, in Step S2, the formation of an active region and an inactive region of the semiconductor layer 2 separately, the formation of the electrode 4 and the formation of an insulating protective film are performed by each step such as a photolithography step, a film-forming step, an ion implantation step, a metal vapor deposition step, and a plating step. As a result, a transistor structure including the semiconductor layer 2 and the electrode 4 is formed on the second substrate 10 (see FIG. 3).

In the example of FIG. 1, the semiconductor device 100 is a field effect transistor and the transistor structure is formed on the second substrate 10 in Steps S1 and S2. Therefore, if the semiconductor device 100 is another semiconductor device, a structure corresponding to the semiconductor device is formed on the second substrate 10.

Next, in Step S3, the semiconductor layer 2 and the second substrate 10 are separated from each other using laser irradiation (laser lift-off step). Specifically, first, the laser beam is irradiated from the lower surface 10b side of the second substrate 10. For the laser beam, a laser beam having a wavelength with a low absorption rate and a high transmission rate in the second substrate 10 is adopted. For example, a laser beam having a wavelength of 4 µm or less is adopted. As a result, the laser beam passes through the second substrate 10 and is incident on the semiconductor layer 2. Further, for this laser beam, a laser beam having a high absorption rate in the semiconductor layer 2 is adopted. For example, a laser beam having a wavelength of 370 nm or less is desirable, and more preferably 360 nm or less. For example, a laser beam with a wavelength of 266 nm, which is a fourth harmonic wave of the Yttrium Aluminum Garnet (YAG) laser, is adopted.

When the laser beam is irradiated, for example, a nitride-based compound semiconductor absorbs the energy of the laser beam at the boundary portion of the semiconductor layer 2 on the second substrate 10 side. The nitride-based compound semiconductor is separated into a single substance of each constituent element by the energy. In other words, the laser beam is irradiated with the amount of light that causes this separation. As a more specific example, gallium nitride separates into gallium and nitrogen. Nitrogen is a gas at room temperature. The formula for this chemical reaction is as follows.

$$2GaN \rightarrow 2Ga + N_2 \qquad (1)$$

That is, at the boundary portion of the semiconductor layer 2 on the second substrate 10 side, gallium nitride is separated into gallium and nitrogen which is a gas. The melting point of gallium is lower than the melting point of gallium nitride, which is about 30 degrees. In this manner, the semiconductor layer 2 is separated into a single substance (gallium) having a melting point lower than its own melting point and a single substance (nitrogen) which is a gas at the boundary portion.

According to the formula (1), the nitrogen gas is generated by the laser irradiation; therefore, the laser beam is irradiated so as to draw a continuous line from the outer periphery of the second substrate 10. Consequently, the nitrogen gas can move outward from between the second substrate 10 and the semiconductor layer 2. When the laser irradiation is completed, the gallium is solidified by cooling. Accordingly, a low melting point layer 30 consisting of gallium is formed between the semiconductor layer 2 and the second substrate 10 (see FIG. 4). The melting point of the low melting point layer 30 is lower than the melting points of all the other layers, specifically, the insulating protective film, the electrode 4, the semiconductor layer 2, and the second substrate 10. Further, the bonded surface 2b is the boundary surface between the semiconductor layer 2 and the low melting point layer 30, and the bonded surface 2b has irregularities (not illustrated) due to irradiation with a laser. The pattern of the irregularity has a pattern that reflects laser irradiation. Therefore, it can be said that the irregularities are a laser irradiation trace.

Next, a laminated structure 100a including the insulating protective film, the electrode 4, the semiconductor layer 2, the low melting point layer 30, and the second substrate 10 is subject to heating. For example, the laminated structure 100a is subject to heating by a heater such as a hot plate (not illustrated). The heater raises the temperature of the laminated structure 100a to a temperature higher than the melting point of the low melting point layer 30 and lower than the melting point of the other layers. As a result, the low melting point layer 30 is melted. Next, the semiconductor layer 2 and the second substrate 10 are parted from each other by separating the semiconductor layer 2 and the second substrate 10 from each other (see FIG. 5). Hereinafter, the laminated structure in which the second substrate 10 is separated from the laminated structure 100a is referred to as a laminated structure 100b. After separation, a part of the low melting point layer 30 solidifies and becomes one of the constituent elements of the laminated structure 100b. Specifically, the low melting point layer 30 constitutes the bottom layer of the laminated structure 100b.

It should be noted that the heating step by the heater is not always necessary in Step S3. The temperature of the laminated structure 100a can be raised by laser irradiation; therefore, the semiconductor layer 2 may be separated from the second substrate 10 during laser irradiation.

Figure 6:
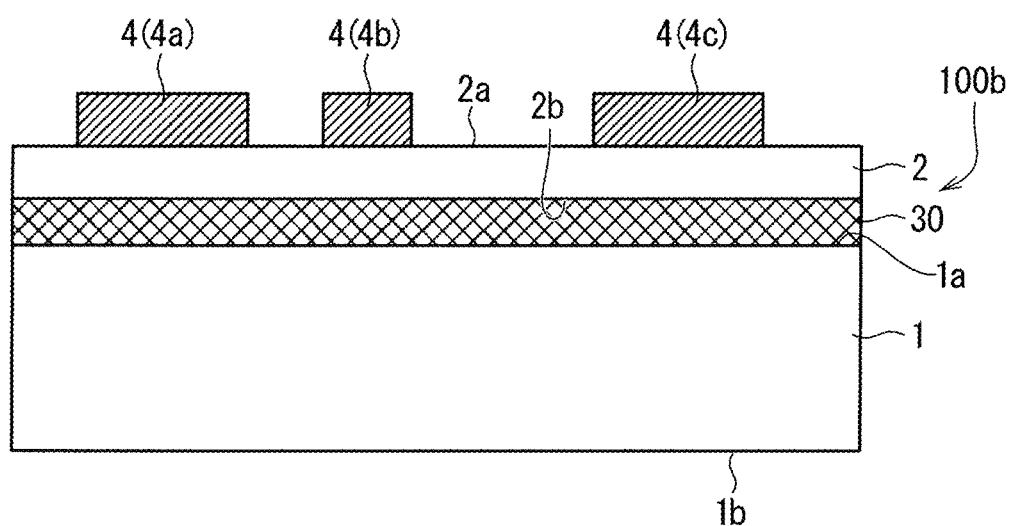
FIG. 6 A cross-sectional view schematically illustrating a configuration example in the process of manufacturing the semiconductor device.
Figure 7:
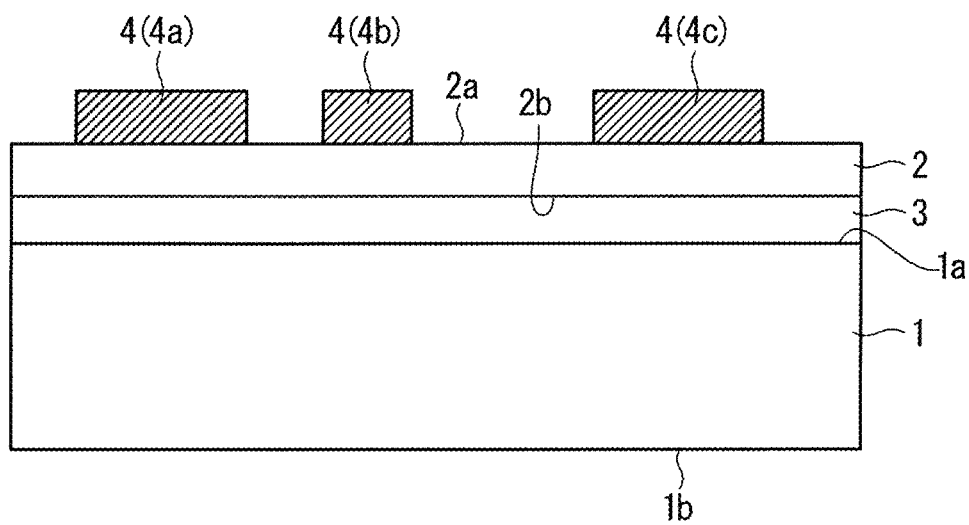
FIG. 7 A cross-sectional view schematically illustrating a configuration example in the process of manufacturing the semiconductor device.

Next, in Step S4, the bonded substrate 1 and the semiconductor layer 2 are overlapped (see FIG. 6). Specifically, the laminated structure 100b is placed on the bonded surface 1a of the bonded substrate 1 so that the low melting point layer 30 of the laminated structure 100b comes into contact with the bonded surface 1a of the bonded substrate 1. Accordingly, the bonded surface 2b of the semiconductor layer 2 is opposite to the bonded surface 1a of the bonded substrate 1 via the low melting point layer 30.

Next, in Step S5, the product formed on the bonded surface 2b of the semiconductor layer 2 by the laser irradiation in Step S3 (that is, the low melting point layer 30) is reacted with another substance, thereby bonding a substance to the bonded substrate 1 and the semiconductor layer 2 while transforming the product into the substance having a melting point higher than that of the low melting point layer 30. The substance functions as the bonding layer 3 (see FIG. 7). As a more specific example, a predetermined space in which the bonded substrate 1 and the laminated structure 100b are placed is set as an oxygen atmosphere, and the bonded substrate 1 and the laminated structure 100b are subject to heating. For example, using a heater such as a hot plate, the bonded substrate 1 and the laminated structure 100b are subject to heating to a temperature higher than the melting point of the low melting point layer 30 and lower than the melting point of the other layers.

As a result, gallium of the low melting point layer 30 is liquefied and adheres to the entire surface of the bonded surface 1a of the bonded substrate 1. Further, the low melting point layer 30 is liquefied; therefore, the low melting point layer 30 fills the irregularities of the bonded surface 2b of the semiconductor layer 2 and can adhere thereto. Then, the gallium is oxidized by the surrounding oxygen and transformed into gallium oxide (that is, the bonding layer 3) in a state of being bonded to the bonded surface 1a of the bonded substrate 1 and the bonded surface 2b of the semiconductor layer 2 (see FIG. 7). The melting point of this bonding layer 3 is higher than the melting point of the low melting point layer 30. In short, the low melting point layer 30 consisting of gallium is transformed into the bonding layer 3 having a high melting point and containing gallium oxide. Further, the gallium oxide has an insulating property.

Next, in Step S6, the via hole 51 is formed. For example, the via hole 51 that extends through the bonded substrate 1, the bonding layer 3, and the semiconductor layer 2 and leads to the electrode 4a is formed by a processing method such as a reactive ion etching method, a wet etching method, or a laser processing method. For the removal of burrs generated on the wall surface of the via hole 51, the via hole 51 may be formed by combining the above processing methods.

Next, in Step S7, the lead-out electrode 5 and the electrode 6 are formed. For example, the lead-out electrode 5 and the electrode 6 are formed by a method such as vapor deposition or a sputtering method. With this, the electrode 6 is electrically connected to the electrode 4a via the lead-out electrode 5.

With the above manufacturing method, the semiconductor device 100 is manufactured (see FIG. 1). Moreover, according to the manufacturing method, the bonding layer 3 is formed using the reactant of the semiconductor layer 2 (low melting point layer 30: gallium) generated by laser irradiation.

For comparison, consideration is given to the conventional manufacturing method. In the conventional manufacturing method, the entire low melting point layer 30 (gallium) is removed after separating the laminated structure 100b from the second substrate 10, then the bonded surface 2b of the semiconductor layer 2 is flattened by polishing or the like. Next, for example, the bonded substrate 1 is bonded to the semiconductor layer 2 with an adhesive or the like. In this case, the removal step of the low melting point layer 30 and the flattening step of the bonded surface 2b are required, and this increases the number of steps. In addition, adopting a material different from the semiconductor layer 2 such as an adhesive as the bonding layer for bonding the bonded substrate 1 and the semiconductor layer 2 increases the manufacturing cost.

Meanwhile, according to the first embodiment, in the bonding step (Step S5) between the bonded substrate 1 and the semiconductor layer 2, the bonding layer 3 is formed using the low melting point layer 30. This eliminates the removal step for the low melting point layer 30 and the flattening step of the bonded surface 2b. Further, the bonding layer 3 is formed using the low melting point layer 30 generated from the semiconductor layer 2; therefore, the bonding layer 3 is configured to contain a constituent element (for example, gallium) of the semiconductor layer 2. According to this, the material cost of the bonding layer 3 can be reduced as compared with the case where the bonding layer 3 is consisting of a material completely different from the semiconductor layer 2 such as an adhesive.

As described above, in the first embodiment, the semiconductor device 100 can be manufactured with a smaller number of steps. In addition, the material cost of the bonding layer 3 can be reduced. That is, productivity can improve.

Further, in the above example, the bonding layer 3 fills the irregularities of the bonded surface 2b of the semiconductor layer 2 and adheres to the bonded surface 2b; therefore, the bonding area between the bonding layer 3 and the semiconductor layer 2 can be increased. According to this, the semiconductor device 100 having high bonding strength can be realized.

<Another Example of Bonding Layer>

In the above example, in the bonding step (Step S5), the bonded substrate 1 and the laminated structure 100b were subject to heating in an atmosphere of a gas such as oxygen that reacts with the low melting point layer 30. Accordingly, the low melting point layer 30 can be reacted with the gas to be transformed into the bonding layer 3. As another specific example of the gas that reacts with the low melting point layer 30, for example, a halogen gas (for example, chlorine gas) can also be adopted. In this case, the gallium in the low melting point layer 30 can be transformed into a halide, more specifically, into gallium chloride ($Ga_2Cl_6$). The melting point of gallium chloride is higher than the melting point of gallium.

<Thinning Treatment of Low Melting Point Layer>

Figure 8:
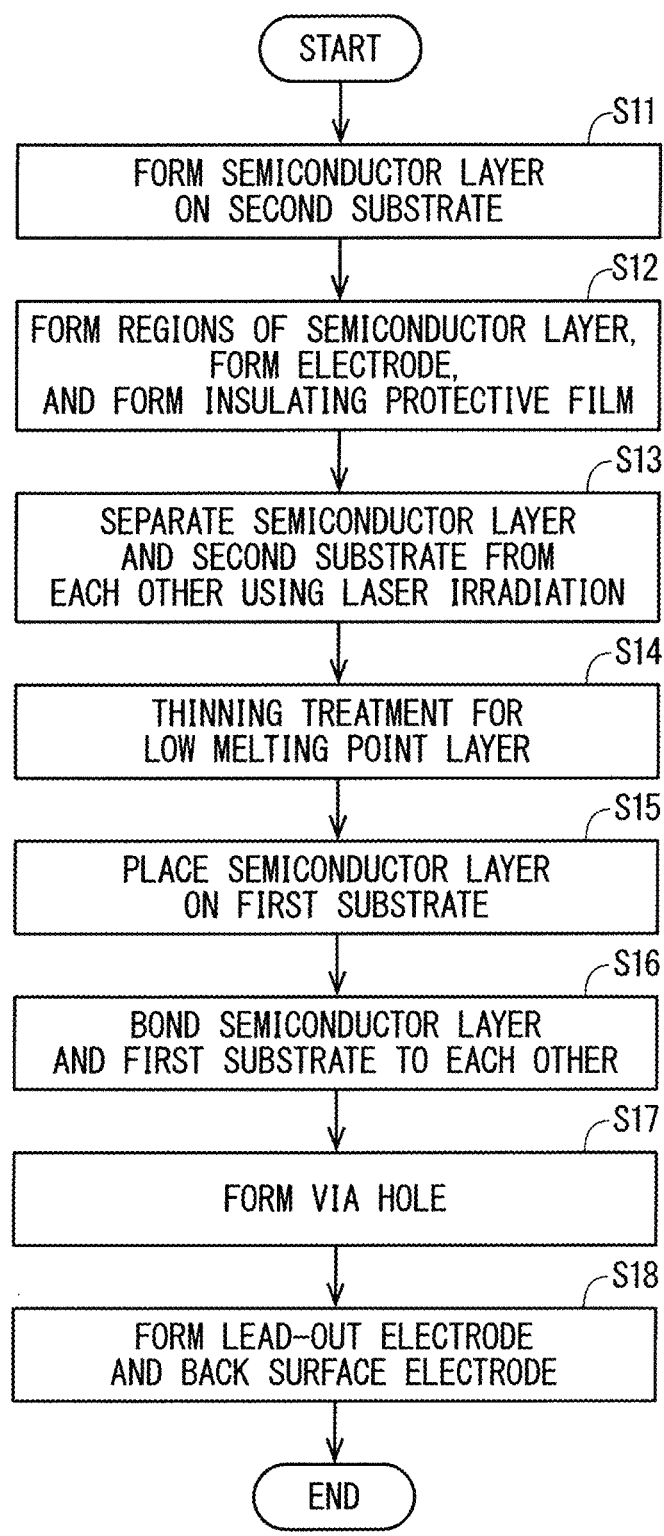
FIG. 8 A flowchart illustrating an other example of a method of manufacturing the semiconductor device according to the first embodiment.

FIG. 8 is a flowchart of another example of a method of manufacturing the semiconductor device 100. Steps S11 to S13 are the same as Steps S1 to S3, respectively. Next, in Step S14, a thinning treatment is performed to reduce the thickness of the low melting point layer 30. For example, a chemical solution (for example, an etching solution) for removing the low melting point layer 30 is supplied to the low melting point layer 30. For example, the laminated structure 100b is immersed in the chemical solution. As the chemical solution, for example, hydrochloric acid is adoptable. As a result, the low melting point layer 30 is gradually removed from the surface thereof by the chemical solution. Then, when the thickness of the low melting point layer 30 reaches the specified thickness, the laminated structure 100b is taken out from the chemical solution and the chemical solution is washed away. Thereby, the low melting point layer 30 can be thinned.

Next, Steps S15 to S18 are performed in this order. Steps S15 to S18 are the same as Steps S4 to S7, respectively.

According to the manufacturing method, before the bonding step (Step S16), the thickness of the low melting point layer 30 is reduced (Step S14). Therefore, the bonding layer 3 can be thinned. As a result, the semiconductor device 100 can be made thinner.

<Insulation Treatment>

The semiconductor device 100 illustrated in FIG. 1 has the via hole 51. The via hole 51 extends through the bonded substrate 1, the bonding layer 3, and the semiconductor layer 2, and the electrode 4 and the electrode 6 are electrically connected to each other by the lead-out electrode 5 in the via hole 51. The lead-out electrode 5 contacts the inner wall of the via hole 51; therefore, a part of the lead-out electrode 5 contacts the bonding layer 3 in the via hole 51.

Meanwhile, in the above example, the bonding layer 3 is formed by transforming the low melting point layer 30 consisting of a conductive metal (gallium) into an insulating compound. However, all the metal of the low melting point layer 30 does not necessarily react, and it is conceivable that the conductive metal (hereinafter referred to as residual conductor) in the bonding layer 3 is exposed on the inner wall of the via hole 51. Therefore, the insulation treatment may be performed to turn the residual conductor contained in the bonding layer 3 exposed in the via hole 51 into an insulator before forming the lead-out electrode 5.

Figure 9:
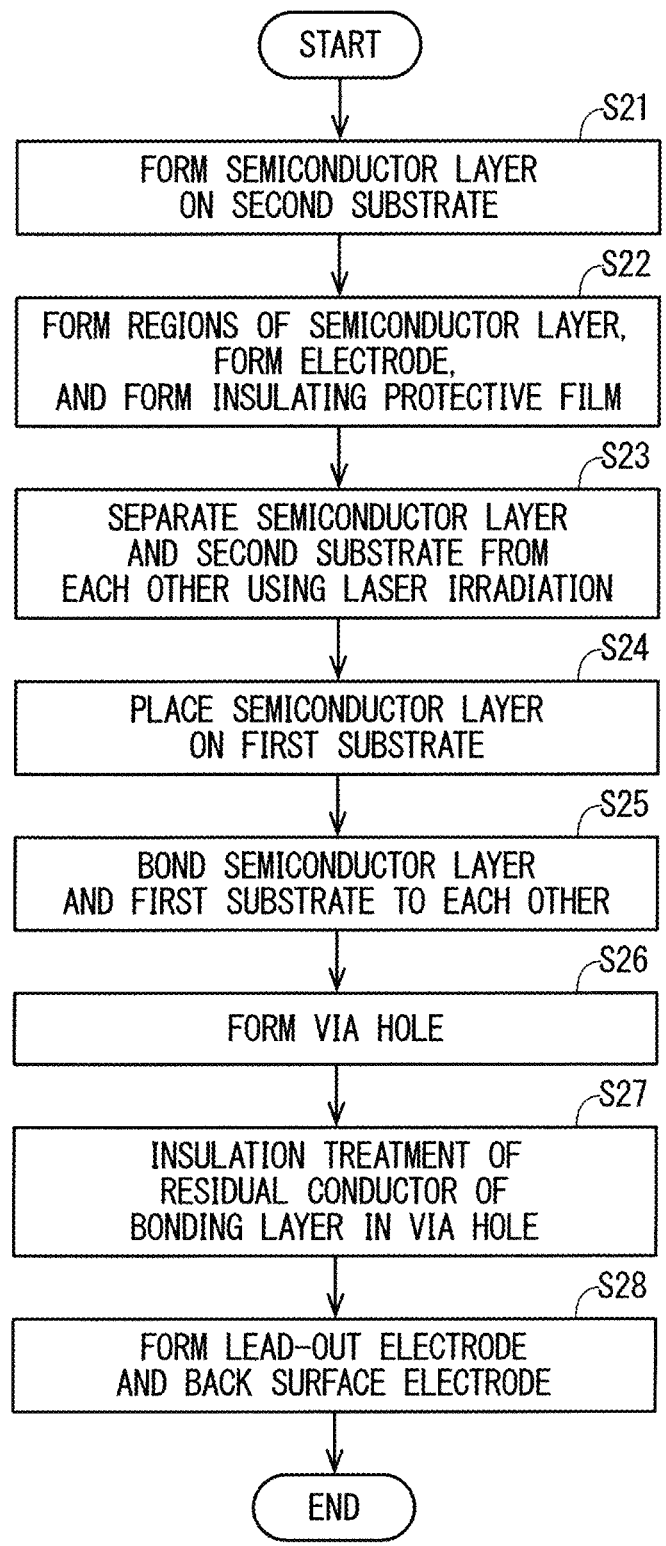
FIG. 9 A flowchart illustrating an other example of a method of manufacturing the semiconductor device according to the first embodiment.
Figure 10:
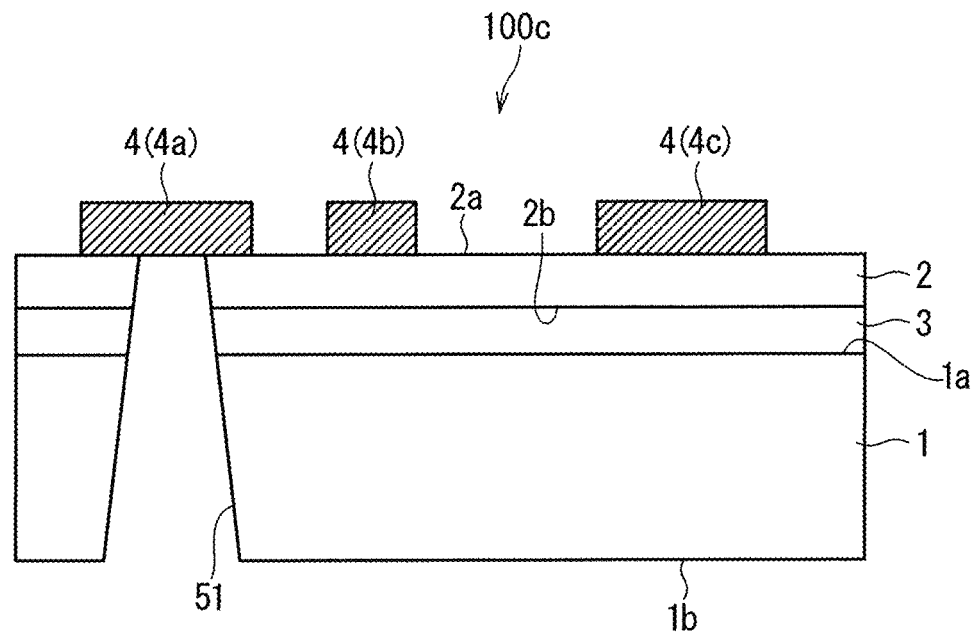
FIG. 10 A cross-sectional view schematically illustrating a configuration example in the process of manufacturing the semiconductor device.

FIG. 9 is a flowchart of an example of the method of manufacturing the semiconductor device 100. Steps S21 to S26 are the same as Steps S1 to S6, respectively. FIG. 10 is a cross-sectional view schematically illustrating a configuration example in the process of manufacturing the semiconductor device 100, and more specifically, illustrates a laminated structure 100c obtained in Step S26. As illustrated in FIG. 10, the via hole 51 is formed in the laminated structure 100c. In Step S27 following Step S26, the residual conductor of the bonding layer 3 exposed in the via hole 51 is turned into an insulator. For example, as in Step S5, the laminated structure 100c may be subject to heating in an atmosphere of a gas such as oxygen gas or chlorine gas that reacts with the residual conductor. As a result, the residual conductor (gallium) on the surface of the bonding layer 3 reacts with a gas such oxygen or a chlorine gas to form an insulating compound.

Next, in Step S28, the lead-out electrode 5 and the electrode 6 are formed in the same manner as in Step S7.

According to the manufacturing method, in Step S27, the residual conductor of the bonding layer 3 exposed in the via hole 51 is turned into an insulator and, this, securely, avoids the situation where the lead-out electrode 5 and the electrode 6 are electrically connected to the bonding layer 3.

Second Embodiment

Figure 11:
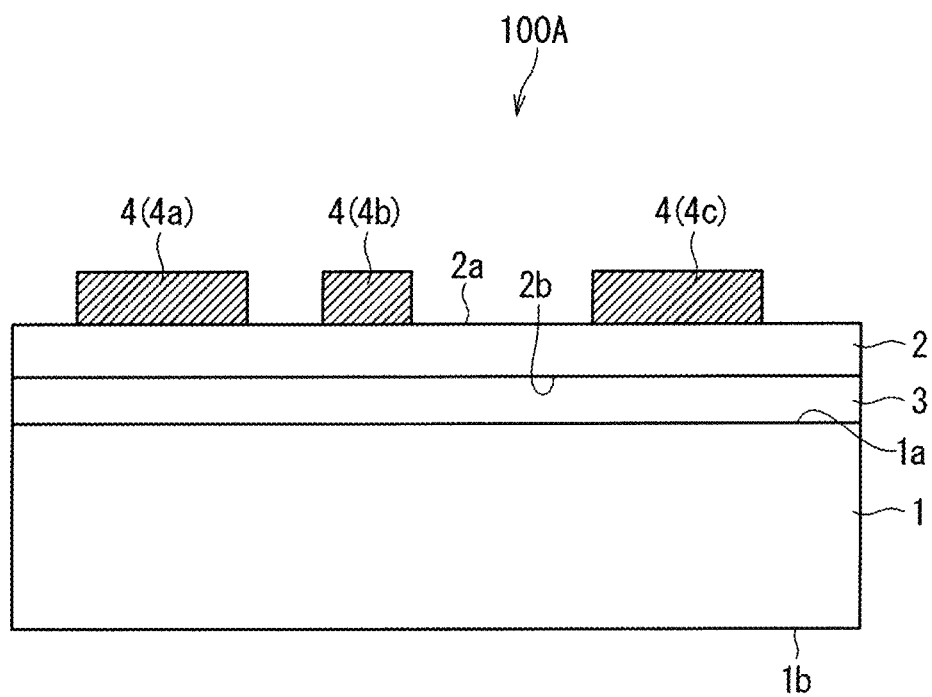
FIG. 11 A cross-sectional view schematically illustrating a configuration example of a semiconductor device according to the second embodiment.

FIG. 11 is a cross-sectional view schematically illustrating a configuration example of a semiconductor device 100 according to a second embodiment. A semiconductor device 100A has the same configuration as the semiconductor device 100 except for the absence of the via hole 51, the lead-out electrode 5 and the electrode 6. Further, a specific configuration example of the bonding layer 3 in the semiconductor device 100A is also different from that of the semiconductor device 100. Specifically, the bonding layer 3 has an alloy containing at least one of the constituent elements (for example, gallium) of the semiconductor layer 2. The substance other than gallium constituting the alloy contains, for example, at least one of magnesium (Mg), cobalt (Co), nickel (Ni), copper (Cu) and silver (Au). For example, an iron-gallium alloy produced by an alloying reaction of iron and gallium can be suitably adopted as the bonding layer 3.

Figure 12:
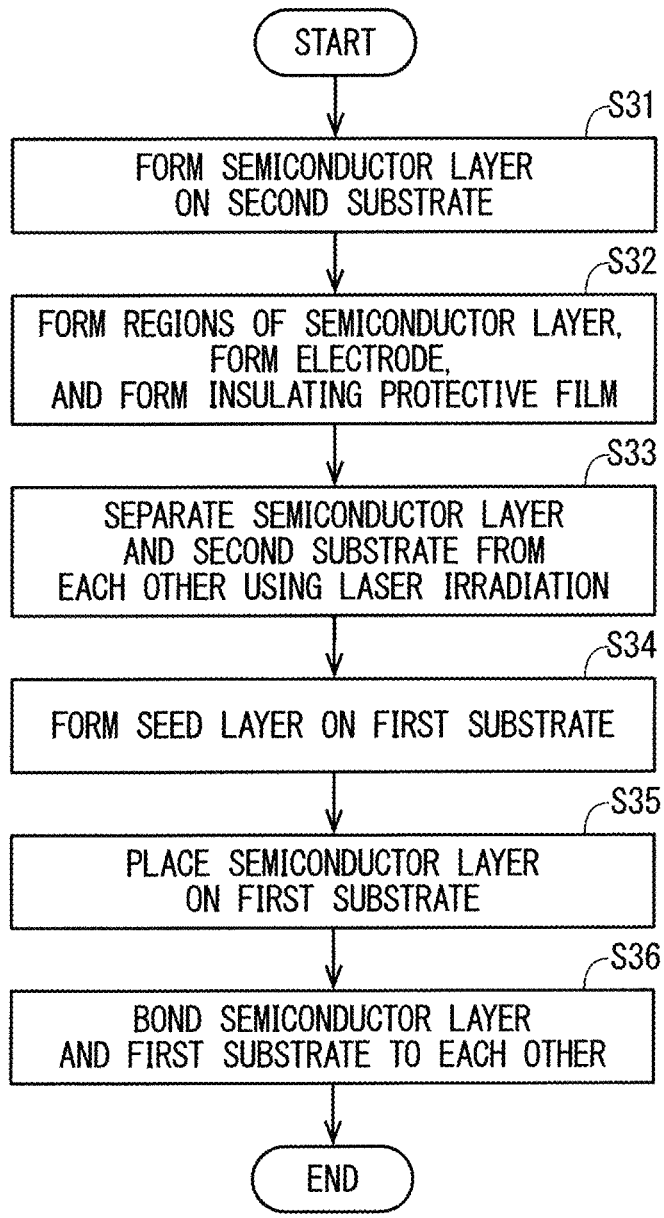
FIG. 12 A flowchart illustrating an example of a method of manufacturing the semiconductor device according to the second embodiment.

Next, an example a method of manufacturing the semiconductor device 100A will be described. FIG. 12 is a flowchart of an example of the method of manufacturing the semiconductor device 100A. Steps S31 to S33 are the same as Steps S1 to S3, respectively. With this, the laminated structure 100b (see FIG. 5) is produced as in the first embodiment. Also in the second embodiment, the boundary surface between the semiconductor layer 2 and the low melting point layer 30 (that is, the bonded surface 2b) has irregularities due to laser irradiation. The irregularities have a pattern characteristic of laser irradiation and are a laser irradiation trace.

Figure 13:
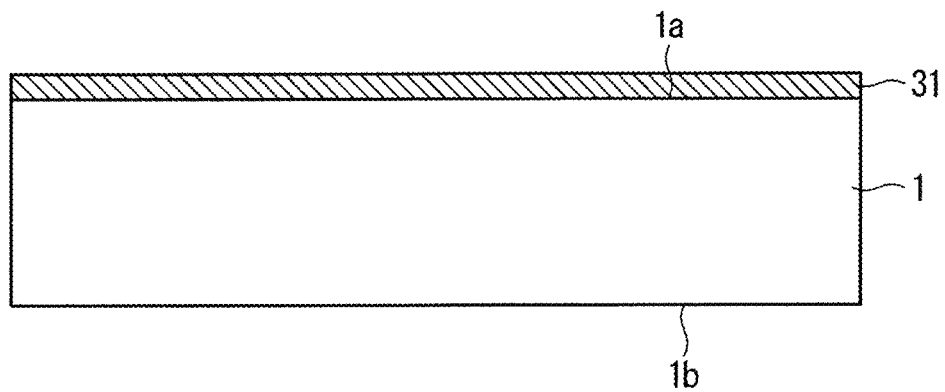
FIG. 13 A cross-sectional view schematically illustrating a configuration example in the process of manufacturing the semiconductor device.

Next, in Step S34, a seed layer 31 that contributes to the reaction with the low melting point layer 30 is formed on the bonded surface 1a of the bonded substrate 1. FIG. 13 is a cross-sectional view schematically illustrating a configuration example of the bonded substrate 1 and the seed layer 31. The seed layer 31 contains, for example, at least one of magnesium (Mg), cobalt (Co), nickel (Ni), copper (Cu) and silver (Au). The seed layer 31 is formed on the bonded surface 1a of the bonded substrate 1 by various film forming methods such as a vapor deposition method or a sputtering method. The execution timing of Step S34 is not limited thereto. Step S34 may be performed before Step S35 described later, and may be performed before Step S31, for example.

Figure 14:
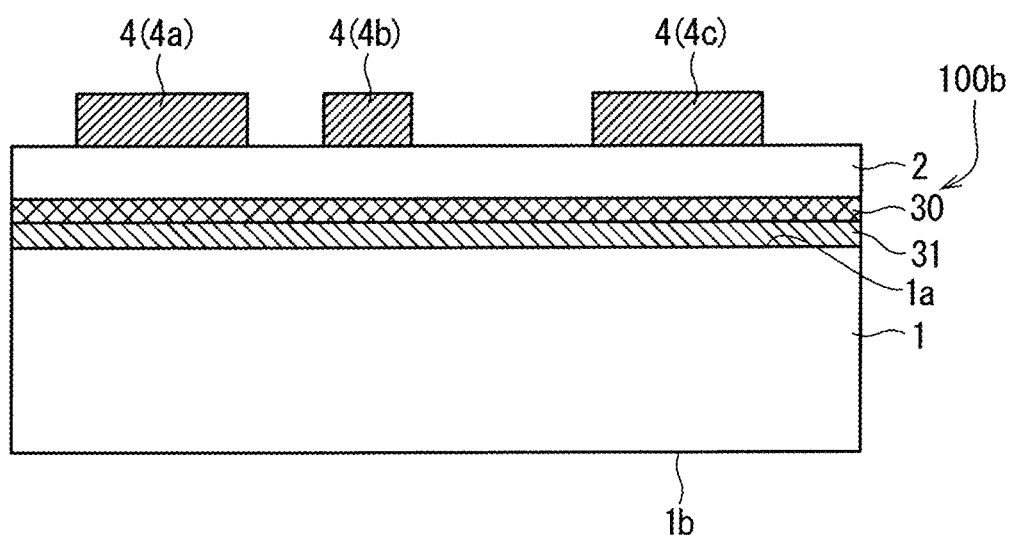
FIG. 14 A cross-sectional view schematically illustrating a configuration example in the process of manufacturing the semiconductor device.

Next, in Step S35, the bonded substrate 1 and the semiconductor layer 2 are overlapped. Specifically, the laminated structure 100b is placed on the bonded substrate 1 so that the low melting point layer 30 comes into contact with the seed layer 31. FIG. 14 is a cross-sectional view schematically illustrating a configuration example in the process of manufacturing the semiconductor device 100A, and illustrates a state in which the laminated structure 100b is placed on the bonded substrate 1.

Next, in Step S36, the low melting point layer 30 and the seed layer 31 are reacted to form the bonding layer 3, and the semiconductor layer 2 and the bonded substrate 1 are bonded by the bonding layer 3. For example, the laminated structure 100b, the seed layer 31, and the bonded substrate 1 are subject to heating using a heater such as a hot plate. As a result, while the low melting point layer 30 is liquefied, the metal of the low melting point layer 30 diffuses into the seed layer 31 to form an alloy as the bonding layer 3. The melting point of the alloy is higher than the melting point of gallium.

The treatment time may be appropriately set according to the thickness of the bonding layer 3. As a specific example, when the low melting point layer 30 is gallium and the seed layer 31 is copper, the reaction progresses with a thickness of about 0.8 µm when the temperature is raised to 200° C. and 30 minutes of the treatment time elapses, thereby forming the bonding layer 3.

Also in the manufacturing method of the second embodiment, the bonding layer 3 is formed using the low melting point layer 30 in the bonding step (Step S36). This eliminates the removal step for the low melting point layer 30 and the flattening step of the bonded surface 2b as in the first embodiment. Further, the constituent elements of the semiconductor layer 2 are used for a part of the bonding layer 3; therefore, the material cost can be reduced as compared with the case of using an alloy made of a material completely different from that of the semiconductor layer 2. That is, productivity can improve.

Further, the area of the bonded surface 2b having irregularities is greater than that of the flat surface; therefore, the bonding layer 3 is bonded to the semiconductor layer 2 with high bonding strength.

Further, the characteristics of the alloy can be adjusted by the type and ratio of its constituent elements; therefore, designing the characteristics of the bonding layer 3 is facilitated.

<Seed Layer Formation>

Figure 15:
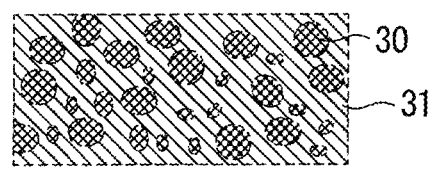
FIG. 15 A cross-sectional view schematically illustrating an example of a state in which parts of a liquid low melting point layer is contained inside a seed layer.

The seed layer 31 may be porous. When the seed layer 31 is porous, the low melting point layer 30 (for example, gallium) liquefied by the heat treatment in the bonding step (Step S36) permeates the inside of the seed layer 31. FIG. 15 is a cross-sectional view schematically illustrating an example of a state in which parts of a liquid low melting point layer 30 is contained inside the seed layer 31. The liquid low melting point layer 30 permeates the inside of the seed layer 31; therefore, the liquid low melting point layer 30 diffuses from the inside of the seed layer 31 and is alloyed to form the bonding layer 3.

As described above, the bonding layer 3 contains an alloy of the metal constituting the seed layer 31 (for example, copper) and the metal (for example, gallium) which is a constituent element of the semiconductor layer 2. Further, the pores of the porous metal (copper) may contain a metal (gallium) which is a constituent element of the semiconductor layer 2.

When the porous seed layer 31 is used in this manner, a part of the liquid low melting point layer 30 permeates the inside of the seed layer 31, and the alloying reaction also occurs inside the seed layer 31 in the bonding step (Step S36). That is, this increases the reaction area and the reaction time can be shortened. Therefore, the bonding layer 3 can be formed within a shorter processing time period.

Further, at least a part of the liquid low melting point layer 30 permeates the inside of the seed layer 31; therefore, the thickness of the bonding layer 3 is made reduced. Therefore, the distance (thickness) between the bonded substrate 1 and the semiconductor layer 2 can be shortened, and the thermal conductivity from the semiconductor layer 2 to the bonded substrate 1 can be enhanced.

<Material of Seed Layer>

In the above example, although metal is adopted as the seed layer 31, the material therefor is not limited thereto, that is, the bonding layer 3 having a higher melting point than the low melting point layer 30 need only be formed by reacting with the low melting point layer 30. For example, a material capable of reacting with the low melting point layer 30 to generate a compound as the bonding layer 3 may also be adopted as the material of the seed layer 31.

Third Embodiment

Figure 16:
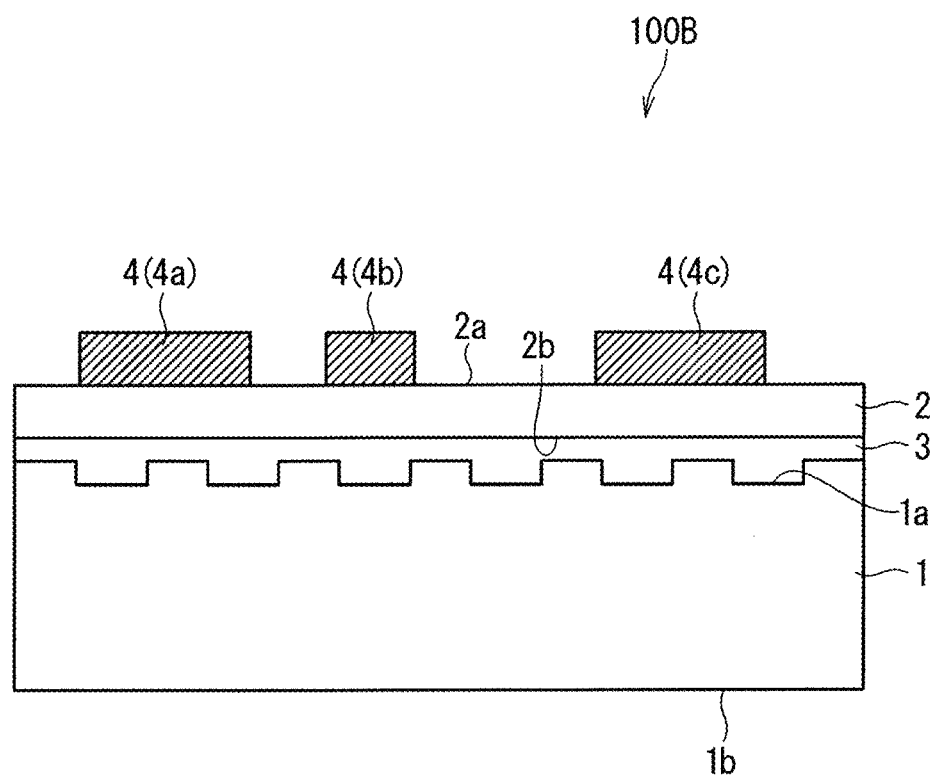
FIG. 16 A cross-sectional view of schematically illustrating a configuration example of a semiconductor device according to a third embodiment.

FIG. 16 is a cross-sectional view schematically illustrating a configuration example of a semiconductor device 100B according to a third embodiment. The semiconductor device 100B includes the bonded substrate 1, the semiconductor layer 2, and the bonding layer 3. Although not illustrated in FIG. 16, the semiconductor device 100B may further include the lead-out electrode 5 and the electrode 6 as in the first embodiment. As illustrated in FIG. 16, in the third embodiment, the bonded surface 1a of the bonded substrate 1 has irregularities. The irregularities are arranged two-dimensionally in plan view. For example, a plurality of line-shaped or dot-shaped convex portions or line-shaped or dot-shaped concave portions may be two-dimensionally arranged thereon. The bonding layer 3 fills the irregularities of the bonded surface 1a and adheres to the bonded surface 1a.

According to this, the bonding area between the bonding layer 3 and the bonded surface 1a of the bonded substrate 1 can be increased, and the bonding strength between the bonded substrate 1 and the bonding layer 3 can be improved.

The irregularity height of the bonded surface 1a of the bonded substrate 1 is, for example, 1 µm or more and 500 µm or less. When the irregularity height is less than the lower limit of the above range, the effect of increasing the surface area due to the irregularity pattern cannot be obtained. Further, when the irregularity height exceeds the upper limit of the above range, this makes it difficult for the bonding layer 3 to fill the irregularities, which makes bonding formation difficult. Further, the irregularity period of the bonded surface 1a desirably is less than 10 times the maximum irregularity height of the bonded surface 1a. When the irregularity period is greater than the upper limit of the above range, the effect of increasing the surface area due to the irregularity pattern cannot be obtained.

Figure 17:
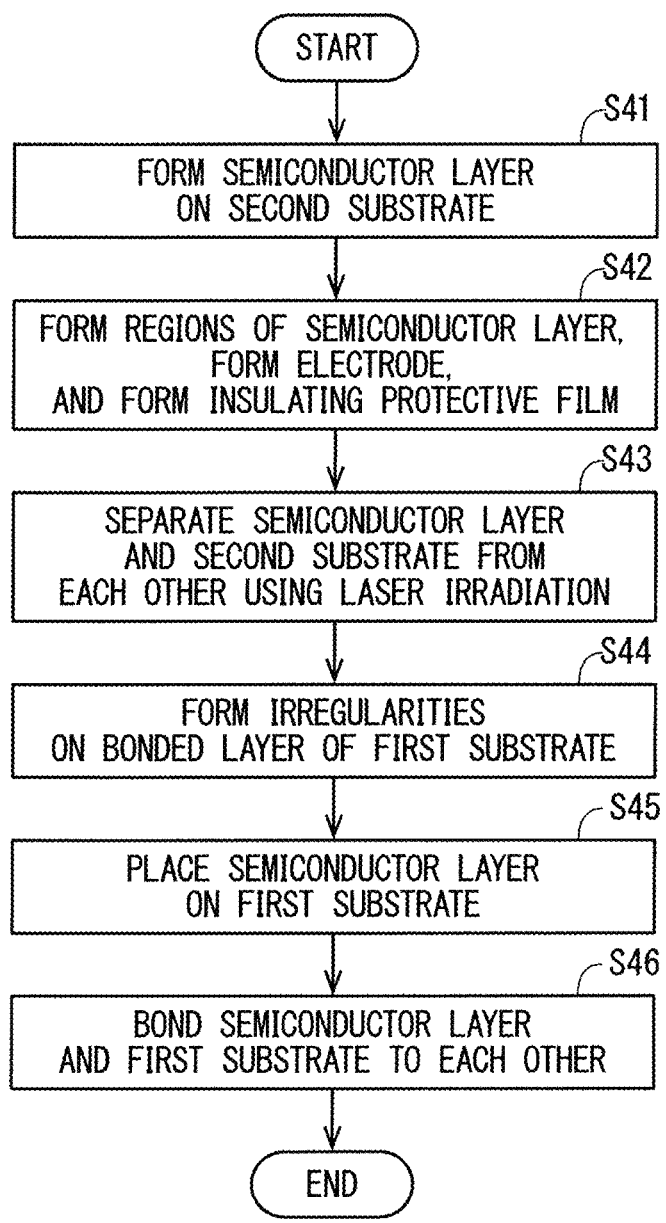
FIG. 17 A flowchart illustrating an example of a method of manufacturing the semiconductor device according to the third embodiment.

Next, an example of a method of manufacturing the semiconductor device 100B according to the third embodiment will be described. FIG. 17 is a flowchart illustrating an example of the method of manufacturing the semiconductor device 100B according to the third embodiment. Steps S41 to S43 are the same as Steps S1 to S3, respectively. With this, the laminated structure 100b (see FIG. 5) is produced as in the first embodiment. Also in the third embodiment, the boundary surface between the semiconductor layer 2 and the low melting point layer 30 (that is, the bonded surface 2b) has irregularities due to laser irradiation. The irregularities have a pattern characteristic of laser irradiation and are a laser irradiation trace.

Next, in Step S44, irregularities are formed on the bonded surface 1a of the bonded substrate 1. For example, the irregularities are formed at an arbitrary portion of the bonded surface 1a by a combination of a resist process such as photolithography and nanoimprint and an etching process such as a wet etching method and a reactive ion etching method. Alternatively, the irregularity may be formed on the bonded surface 1a of the bonded substrate 1 by machining or the like.

Figure 18:
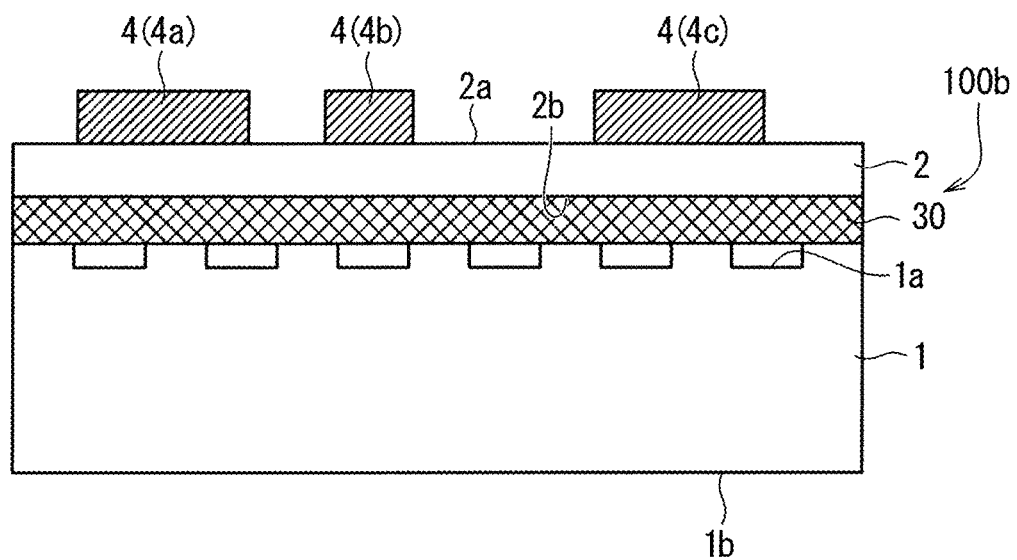
FIG. 18 A cross-sectional view schematically illustrating a configuration example in the process of manufacturing the semiconductor device.

Next, in Step S45, the bonded substrate 1 and the semiconductor layer 2 are overlapped. Specifically, the laminated structure 100b is placed on the bonded surface 1a of the bonded substrate 1 so that the low melting point layer 30 comes into contact with the bonded surface 1a. FIG. 18 is a cross-sectional view schematically illustrating a configuration example in the process of manufacturing the semiconductor device 100B, where the laminated structure 100b is placed on the bonded surface 1a of the bonded substrate 1.

Next, in Step S46, the low melting point layer 30 is reacted to form the bonding layer 3. For example, the laminated structure 100b and the bonded substrate 1 are subject to heating using a heater such as a hot plate in an atmosphere of a gas such as oxygen gas or chlorine gas that is reacted with the low melting point layer 30. Accordingly, the low melting point layer 30 is liquefied to fill the irregularities of the bonded surface 2b of the semiconductor layer 2 and the irregularities of the bonded surface 1a of the bonded substrate 1 while reacting with a gas such as oxygen gas or chlorine gas to form the bonding layer 3. With this, the semiconductor device 100B according to the third embodiment can be manufactured.

Also in the manufacturing method of the third embodiment, the bonding layer 3 is formed using the low melting point layer 30 in the bonding step (Step S46). This eliminates the removal step for the low melting point layer 30 and the flattening step of the bonded surface 2b of the semiconductor layer 2. Further, the areas of the bonded surface 2b and the bonded surface 1a having irregularities are greater than that of the flat surface; therefore, the bonding layer 3 is bonded to each of the semiconductor layer 2 and the bonded substrate 1 with high bonding strength.

<Irregularities>

The structure of irregularities of the bonded substrate 1 does not have to be the periodic structure as illustrated in FIG. 16, and may have any pattern. For example, convex portions or concave portions may be formed at random positions in plan view. Further, the irregularity pattern may be appropriately set. For example, the convex portions or concave portions may be a dot pattern, or may a line pattern. Further, the bonded surface 1a may be an irregularity pattern due to a plurality of mildly inclined structures. That is, if irregularities are formed on the bonded surface 1a, the area of the bonded surface 1a of the bonded substrate 1 can be made greater than that of the flat surface regardless of the pattern thereof, and the bonding strength can be improved.

Figure 19:
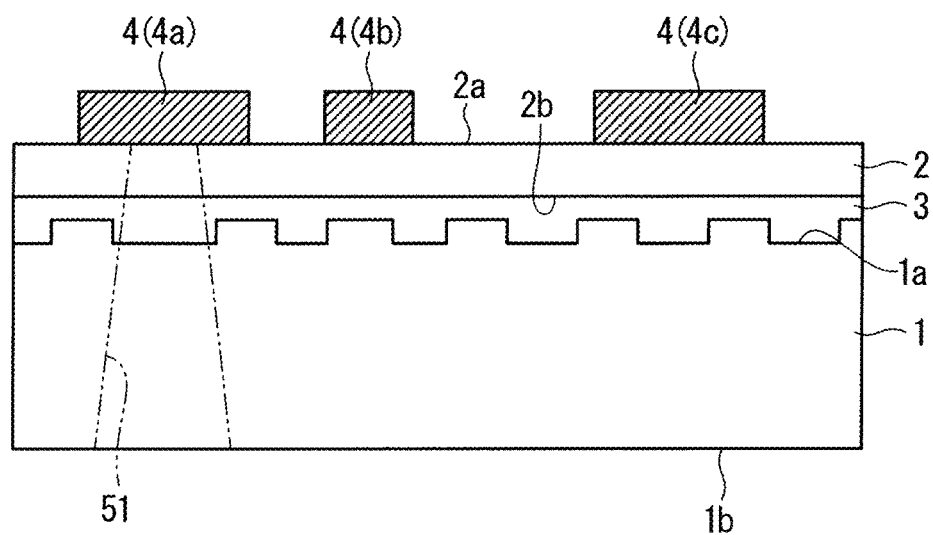
FIG. 19 A cross-sectional view schematically illustrating a configuration example in the process of manufacturing the semiconductor device.

Also, in the third embodiment, when the via hole 51, the lead-out electrode 5 and the electrode 6 are formed, the irregularity pattern may be set according to the position of the via hole 51. FIG. 19 is a cross-sectional view schematically illustrating a configuration example in the process of manufacturing the semiconductor device, and is a diagram schematically illustrating a configuration example of the semiconductor device 100B shortly before the via hole 51 is formed. As illustrated in FIG. 19, the region where the via hole 51 is formed in the bonded surface 1a of the bonded substrate 1 corresponds to a recess. Therefore, the thickness of the bonded substrate 1 is thin in the region where the via hole 51 is formed.

Accordingly, reduction in the amount of etching of the bonded substrate 1 when forming the via hole 51 is ensured. On the other hand, the thickness of the bonding layer 3 is thick in the region where the via hole 51 is formed. Therefore, for example, when the etching rate of the bonded substrate 1 is lower than the etching rate of the bonding layer 3, the irregularity pattern of the bonded surface 1a may be determined so that the bonded substrate 1 becomes thin in the region where the via hole 51 is formed. When the via hole 51 is formed, the etching amount of the bonded substrate 1 having a low etching rate can be reduced, so that the manufacturing throughput of the semiconductor device 100B can be improved.

Figure 20:
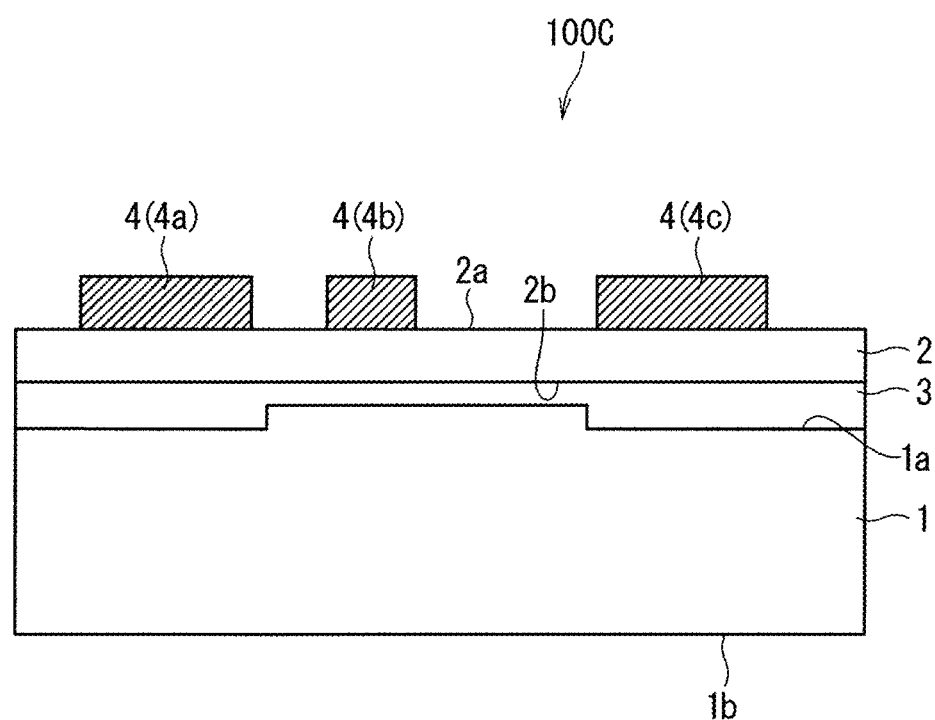
FIG. 20 A cross-sectional view of schematically illustrating a configuration example of a semiconductor device according to the third embodiment.

FIG. 20 is a cross-sectional view schematically illustrating a configuration example of a semiconductor device 100C. This semiconductor device 100C has the same configuration as the semiconductor device 100B except for the irregularity pattern of the bonded surface 1a of the bonded substrate 1. In the example of FIG. 20, the bonded surface 1a of the bonded substrate 1 has a convex portion in the region between the electrodes 4a and 4c in plan view.

Meanwhile, in the semiconductor device 100C, the electrode 4a functions as a source electrode and the electrode 4c functions as a drain electrode; therefore, a current flows in the semiconductor layer 2 between the electrodes 4a and 4c. Therefore, a portion of the semiconductor layer 2 between the electrodes 4a and 4c functions as a heat generating source.

In the example of FIG. 20, the bonded surface 1a of the bonded substrate 1 has the convex portion below the heat generating portion. Consequently, the distance between the heat generating portion and the bonded substrate 1 can be shortened, and the heat from the heat generating portion can be easily transferred to the bonded substrate 1.

In the example of FIG. 20, although the convex portion is formed only below the heat generating portion, the irregularities may be formed in other regions as well. In this case, the width of the convex portion below the heat generating portion (the width in the arrangement direction in which the electrodes 4a and 4c are arranged) may be greater than the width of the convex portion in the other regions.

The embodiments can be combined, appropriately modified or omitted.

While the present disclosure has been illustrated and described in detail, the foregoing description is in all aspects illustrative and not restrictive. It is therefore understood that numerous modifications and variations can be devised.

EXPLANATION OF REFERENCE SIGNS 1 first substrate (bonded substrate), 10 second substrate, 1a, 2a bonded surface, 2 semiconductor layer, 3 bonding layer, 31 seed layer, 4 electrode, 51 via hole.

The invention claimed is:
1. A semiconductor device comprising:
a first substrate;
a semiconductor layer consisting of a nitride-based compound semiconductor; and
a bonding layer bonded to the first substrate and the semiconductor layer between the first substrate and the semiconductor layer, and containing at least one of constituent elements of the nitride-based compound semiconductor, wherein
the bonding layer contains a porous material and the constituent elements of the semiconductor layer are present in pores of the porous material.

2. The semiconductor device according to claim 1, wherein
the bonding layer contains a compound of the constituent elements.

3. The semiconductor device according to claim 2, wherein
the bonding layer contains an oxide of the constituent elements of the semiconductor layer.

4. The semiconductor device according to claim 1, wherein
the bonding layer contains an alloy of the constituent elements of the semiconductor layer.

5. The semiconductor device according to claim 1, wherein
a bonded surface of the semiconductor layer bonding to the bonding layer has irregularities and the bonding layer fills in the irregularities.

6. The semiconductor device according to claim 1, wherein
a bonded surface of the first substrate bonding to the bonding layer has irregularities and the bonding layer fills in the irregularities.

7. The semiconductor device according to claim 1, wherein
the first substrate includes a silicon substrate or a silicon carbide substrate.

8. The semiconductor device according to claim 1, wherein
the constituent elements of the semiconductor layer include gallium.

* * * * *